Oct. 21, 1924.
H. P. KRAFT
PIPE COUPLING
Filed Nov. 10, 1921
1,512,895
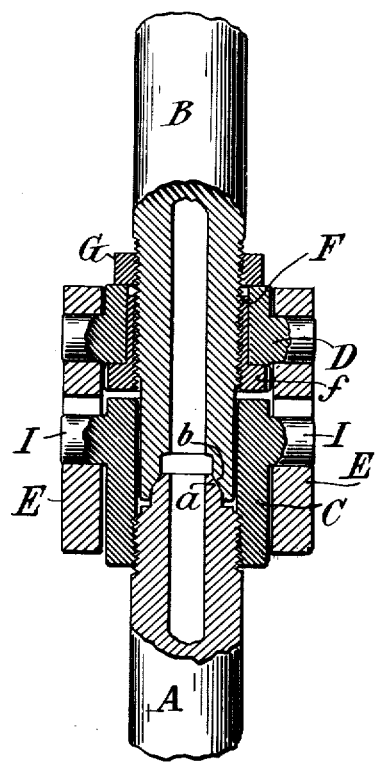
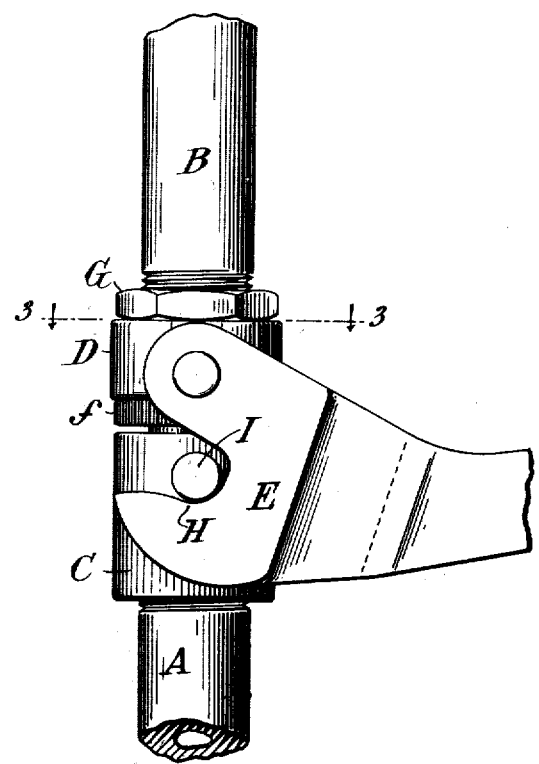
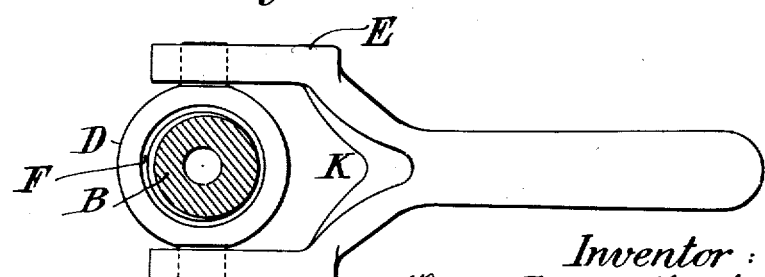
Inventor:
Henry Phillip Kraft,
By Attorneys, Patented Oct. 21, 1924.

1,512,895

UNITED STATES PATENT OFFICE.

HENRY PHILLIP KRAFT, OF RIDGEWOOD, NEW JERSEY; EDGAR J. PHILLIPS AND EARL A. DARR EXECUTORS OF SAID HENRY PHILLIP KRAFT, DECEASED.

PIPE COUPLING.

Application filed November 10, 1921. Serial No. 514,262.

*To all whom it may concern:*

Be it known that I, HENRY PHILLIP KRAFT, a citizen of the United States, residing at Ridgewood, in the county of Bergen and State of New Jersey, have invented certain new and useful Improvements in Pipe Couplings, of which the following is a specification.

The present invention relates to pipe couplings, and aims to provide certain improvements therein. More particularly, the invention relates to couplings for vulcanizers wherein it becomes necessary to couple short lengths of standard pipe to one another. In such apparatus it is important that a steam-tight joint be provided between the pipe sections, and also that the coupling and uncoupling operations be readily made. As the space in such apparatus is limited, it is also desirable that the coupling be as compact as possible.

According to the present invention I provide a device for directly coupling together pipe sections having cooperating internal and external seating faces, the pipe sections each carrying an element of the coupling proper. To protect the external seating face on the pipe section against injury when in uncoupled relation, and to protect the coupled pipe sections against injury after seating, the coupling comprises means for protecting the seating faces on the pipe sections. Means are also provided for insuring a proper seating for the cooperating faces on the pipe sections preliminary to the final coupling operation. For forcing the pipe sections into steam-tight engagement a lever having cam surfaces is employed, and as these surfaces are subject to wear after long usage, means for compensating such wear are provided. Said means preferably consist in having the lever carrying element adjustable on the pipe section.

The invention also includes other features of improvement which will be hereinafter more fully described.

Referring to the drawings, wherein one embodiment of the invention is disclosed,—

Figure 1 is a side elevation showing the pipe sections in coupled relation.

Fig. 2 is a longitudinal section taken at right angles to Fig. 1.

Fig. 3 is a transverse section of Fig. 1 taken on the line 3—3.

Referring to the drawings, let A and B indicate the standard pipe sections which it is desired to couple together, and C, D and E the coupling parts by means of which said coupling operation is accomplished. The adjacent ends of the pipe sections are formed with cooperating seating faces whereby a steam-tight joint may be provided. As herein shown this is accomplished by forming the pipe secton A with a tapered head $a$, which cooperates with a correspondingly tapered seat $b$ on the pipe section B. Mounted on the end of the section A in any suitable manner, preferably by screw-threading, is the coupling part C, which extends beyond the end of said section and provides a protecting sleeve for the end of the pipe section A and guide for the end of pipe section B. The other elements of the coupling proper, D and E, are mounted on the section B a suitable distance from the seating end thereof. These coupling parts are adjustably mounted on the pipe section by being carried by a suitable bushing F, which is screw-threadedly mounted on the pipe. To fixedly position the coupling part D on said sleeve a lock nut G is employed, as best shown in Figs. 1 and 2.

In order to insure a steam-tight joint between the seating faces of the pipe sections, the bifurcated lever E, which is pivotally carried by the coupling part D, is provided with cam surfaces H adapted to engage the outwardly projecting pins I on the coupling member C to force the pipe sections into intimate contact and retain them in such position. After continued usage it will be appreciated that a certain amount of wear will take place on the engaging surfaces of the pins I and cams H. In order to compensate for this wear and at all times insure a proper seating for the cooperating faces on the pipe sections, suitable means are provided. These consist in having the coupling part D longitudinally adjustable on the pipe B. Such adjustment may be provided by proper manipulation of the flange $f$ of the bushing F and the lock nut G. The flange $f$ is preferably provided with a knurled or otherwise roughened surface to increase the finger gripping action thereon.

In the operation of the device, the pipe sections to be coupled together are provided at their adjacent ends with the complementary coupling parts C and D, the latter permanently carrying the lever E. These sections are brought into coupling position through a relatively longitudinal movement of the parts, the lever E being in a retracted or inoperative position so that the lower branches thereof, which are provided with the cam surfaces H, will not interfere with such operation by contacting with the pins I. The upper portion of the coupling member C which extends beyond the end of the pipe section A, serves to receive and guide the end of the pipe section B which is unthreaded and of slightly smaller diameter than the remainder of said pipe section, so that the cooperating seating faces on said pipe sections will be brought into proper seating position. When thus brought into position the lever arm E is moved downwardly so that the thrust of the cam surfaces H engaging the pins or reaction members I will force the seating faces $a$ and $b$ together with considerable pressure. In uncoupling the pipe sections it is merely necessary to raise the lever E to a point where no interference is encountered between the lower portion of said lever and the pins I, and the pipe sections then separated by a longitudinal movement. To permit a great angular movement for the lever E, a considerable portion of said lever is cut away between the bifurcated arms and extending inwardly a considerable distance, as indicated at K in Fig. 3.

While I have shown and described a single embodiment of the present invention, it will be understood that I do not wish to be limited to the precise embodiment as disclosed, since various changes may be made without departing from the spirit of the invention.

What I claim is:—

1. In combination, a pair of standard pipe sections, one having an external tapered seating face and the other having a cooperating tapered internal seating face, said seating faces being substantially unalterable in form, means comprising a bushing normally protecting the external seating face and the internal wall of said bushing being smooth and of substantially the same diameter as the external diameter of the pipe sections, thereby providing a guide for positioning the pipe sections preliminary to coupling them together and means for coupling the sections together.

2. In combination, a pair of standard pipe sections having cooperating end seating faces which are unalterable in form, coupling means carried by said sections for forcing said seating faces into intimate contact comprising a pivoted lever carried by one of the pipe sections and adapted to engage a part carried by the other pipe section, the lever having a cam surface and means for compensating wear on said cam surface and its engaging part.

3. In combination, a pair of standard pipe sections having cooperating end seating faces, coupling means for forcing said seating faces which are unalterable in form into intimate contact, said coupling means comprising a pivoted cam lever mounted on a part carried by one of the pipe sections and adapted to engage a part carried by other pipe section, the part carrying the lever being adjustable on the pipe section to compensate for wear on the cam surface.

4. In combination, a pair of standard pipe sections of substantially uniform diameter and means for coupling said sections together, said means comprising a pivoted lever longitudinally adjustable on one of the pipe sections, said adjustability being provided by mounting the lever upon a sleeve carried by a bushing screw-threaded on the pipe, and a lock nut for engaging the top of the sleeve to lock the bushing and sleeve in place.

In witness whereof, I have hereunto signed my name.

HENRY PHILLIP KRAFT.

Certificate of Correction.

It is hereby certified that in Letters Patent No. 1,512,895, granted October 21, 1924, upon the application of Henry Phillip Kraft, of Ridgewood, New Jersey, for an improvement in "Pipe Couplings," errors appear in the printed specification requiring correction as follows: Page 2, line 69, claim 3, strike out the words " which are unalterable in form " and insert the same to follow the word " faces " in line 68, same claim; same page, line 78, claim 4, strike out the words " of substantially uniform diameter " and insert instead *having cooperating end seating faces which are unalterable in form;* and that the said Letters Patent should be read with these corrections therein that the same may conform to the record of the case in the Patent Office.

Signed and sealed this 18th day of November, A. D. 1924.

[SEAL.]

KARL FENNING,
*Acting Commissioner of Patents.*